(12) United States Patent
Hess

(10) Patent No.: US 6,516,918 B2
(45) Date of Patent: Feb. 11, 2003

(54) TREE STAND WITH CABLE SUPPORT

(76) Inventor: Robert L. Hess, 123 Hess Hill Rd., Danville, PA (US) 17821

( * ) Notice: Subject to any disclaimer, the term of this patent is extended or adjusted under 35 U.S.C. 154(b) by 0 days.

(21) Appl. No.: 09/960,115

(22) Filed: Sep. 21, 2001

(65) Prior Publication Data

US 2002/0036116 A1 Mar. 28, 2002

Related U.S. Application Data

(60) Provisional application No. 60/234,501, filed on Sep. 22, 2000.

(51) Int. Cl.$^7$ ................................ E06C 7/16; E04G 3/00
(52) U.S. Cl. .......................... 182/20; 182/116; 182/187
(58) Field of Search .......................... 182/20, 116, 187, 182/188, 135, 136, 108, 109; 108/152; 248/218.4

(56) References Cited

U.S. PATENT DOCUMENTS

| | | | | |
|---|---|---|---|---|
| 1,953,390 A | * | 4/1934 | Bosch | 182/116 X |
| 3,703,939 A | * | 11/1972 | Maxwell | 182/116 X |
| 4,022,292 A | | 5/1977 | Van Gompel | |
| 4,552,247 A | * | 11/1985 | Purdy | 182/116 |
| 4,650,035 A | * | 3/1987 | Eubanks | 182/116 X |
| 5,064,020 A | * | 11/1991 | Eagleson | 182/116 X |
| 5,105,908 A | * | 4/1992 | Freund | 182/116 X |
| 5,143,176 A | * | 9/1992 | Burdette | 182/187 |
| 5,275,257 A | * | 1/1994 | Robertson | 182/187 X |
| 5,368,127 A | * | 11/1994 | Phillips | 182/187 |
| 5,566,780 A | * | 10/1996 | Bambrough | 182/116 |
| 5,590,738 A | * | 1/1997 | Hunt et al. | 182/116 |
| 5,655,623 A | * | 8/1997 | Skyba | 182/116 |
| 5,791,436 A | | 8/1998 | Talley | |
| 6,053,278 A | * | 4/2000 | Myers | 182/20 |
| 6,079,517 A | * | 6/2000 | Payne | 182/187 |
| 6,138,792 A | * | 10/2000 | Morris | 182/187 X |
| 6,186,271 B1 | * | 2/2001 | Borries et al. | 182/20 |
| 6,199,660 B1 | * | 3/2001 | Meeks | 182/116 |
| 6,334,508 B1 | * | 1/2002 | Shields | 182/116 |

* cited by examiner

Primary Examiner—Daniel P. Stodola
Assistant Examiner—Hugh B. Thompson
(74) Attorney, Agent, or Firm—John J. Elnitski, Jr.

(57) ABSTRACT

A tree stand which includes an upper section, middle section, lower section and a pair of tensioner cable units. The upper section provides standing room and seating for the user of the tree stand. The lower section and the middle section support the upper section in the air and against the tree. The lower section and the middle section include a pair of side rails with ladder rungs attached between the side rails. The ladder rungs allow access by the user to the upper section by climbing the ladder rungs. The ladder also provide structural support to the middle section and the lower section. The tensioner cable units provide tension to hold together the upper section, middle section and lower section.

20 Claims, 18 Drawing Sheets

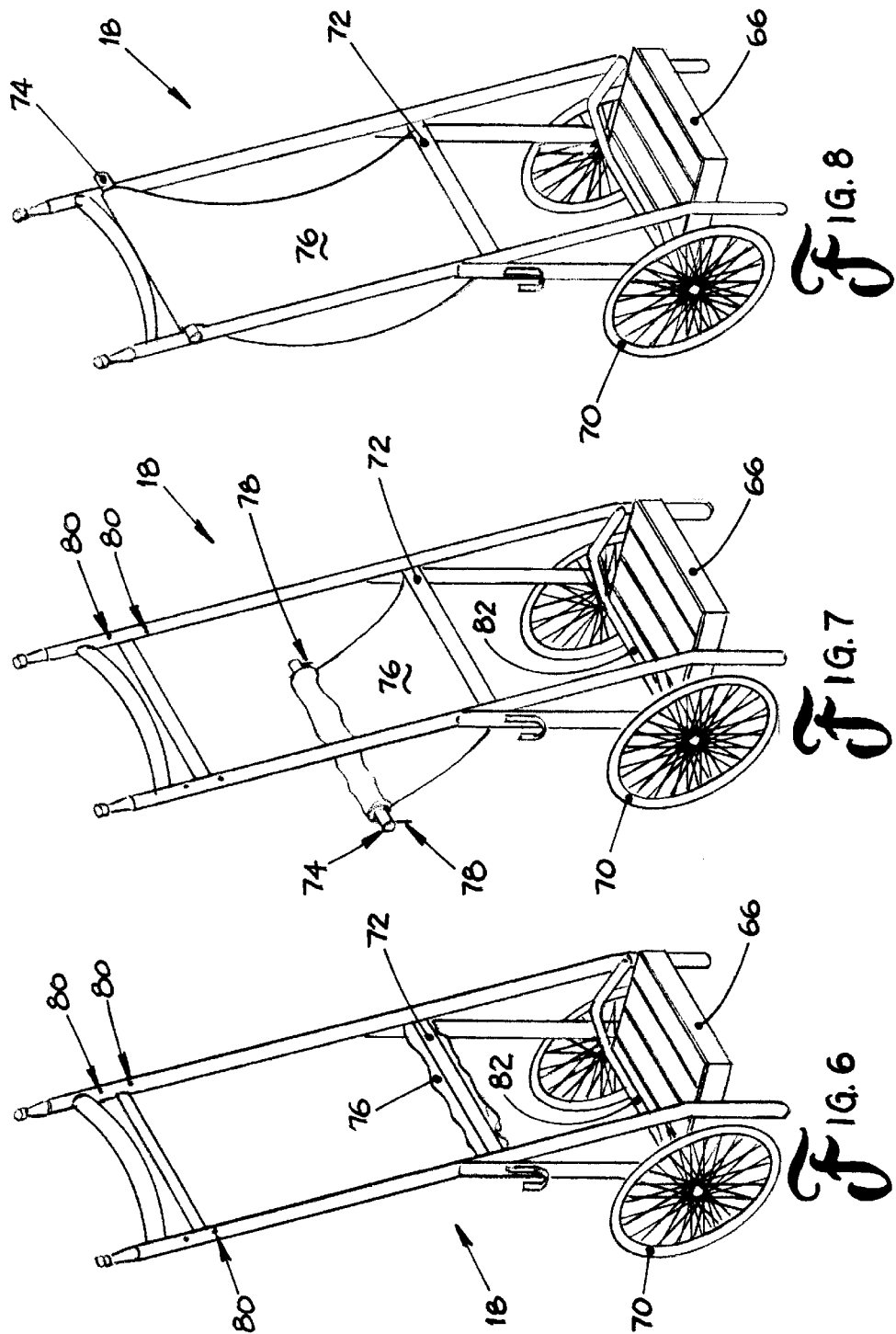

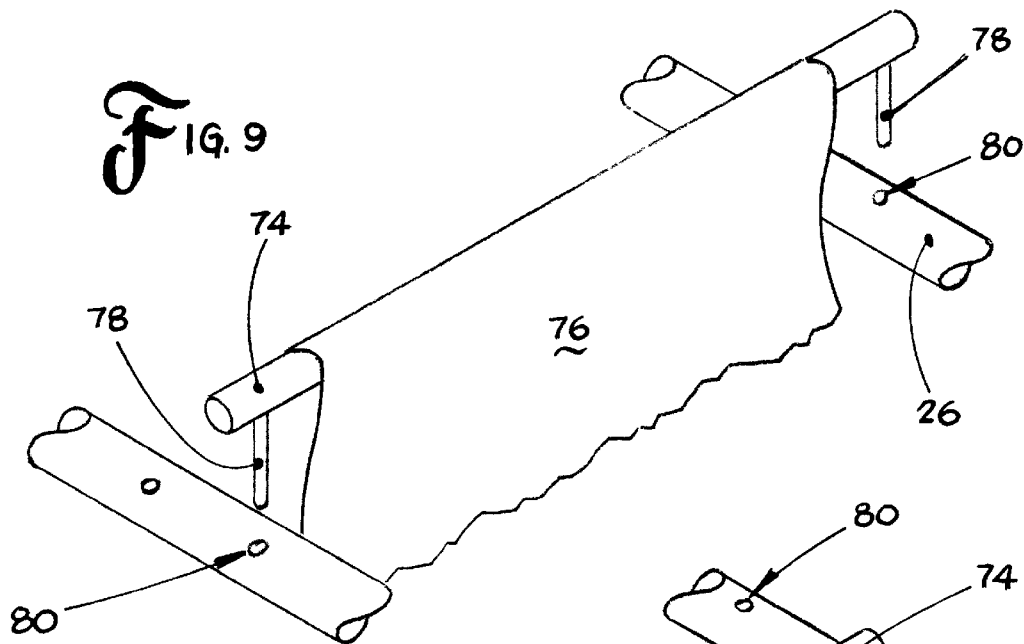
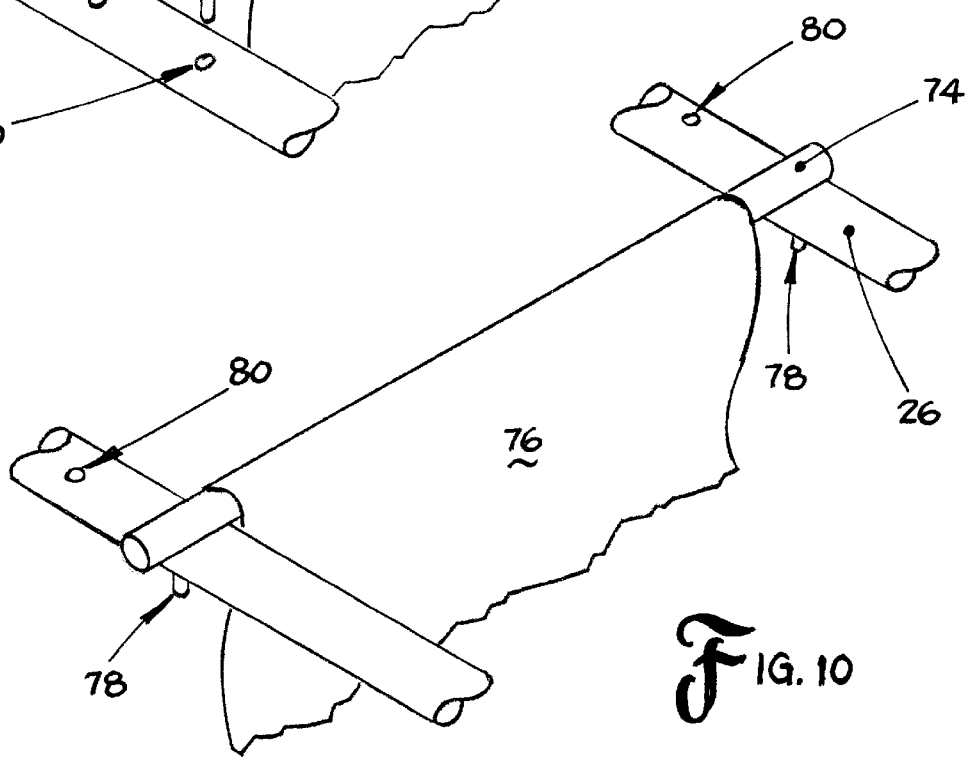

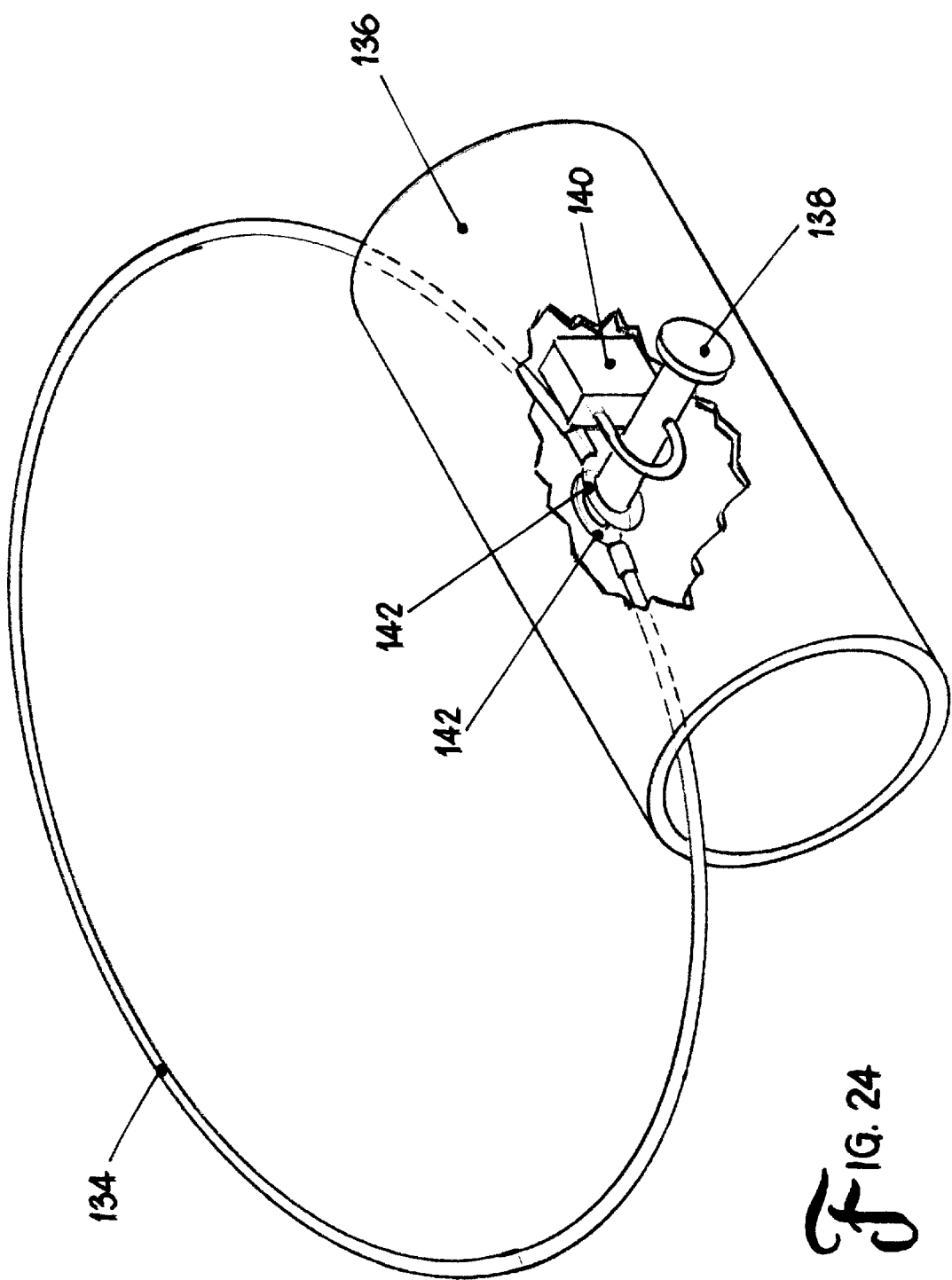

TREE STAND WITH CABLE SUPPORT

This application claims the benefit of and hereby incorporates by reference U.S. Provisional Application No. 60/234,501 filed Sep. 22, 2000.

BACKGROUND

The majority of tree stands on the market for hunting purposes all include a seat and some means to climb up to the seat, such as a ladder type frame. Most of these tree stand can be folded or disassembled to transport and store. Most tree stands on the market lack a system to increase the stability and secure assembly of the tree stand.

It is an object of the present invention to provide a tree stand with a system to increase the stability and secure assembly of the tree stand.

SUMMARY OF THE INVENTION

A tree stand that includes a top to rest the tree stand against an upright object and a bottom to rest the tree stand against the ground. There are at least two sections between the top and the bottom which can be assembled to form the tree stand and disassembled to reduce the transportable size of the tree stand. The at least two sections have a pair of side rails which define an outside form of each of the at least two sections. There are a plurality of ladder rungs attached between the side rails and a platform between the side rails near the top. Finally there is at least one cable tensioner unit which is connected near the top and connected near the bottom and provides tension between the top and bottom to hold the at least two sections together. The cable tensioner unit provides increase the stability and secure assembly of the tree stand.

BRIEF DESCRIPTION OF THE DRAWINGS

FIG. 6 is a perspective view of an upper section of the tree stand according to the present invention;

FIG. 7 is another perspective view of an upper section of the tree stand according to the present invention;

FIG. 8 is another perspective view of an upper section of the tree stand according to the present invention;

FIG. 9 is a perspective view of a section of the upper section of the tree stand including a top seat support according to the present invention;

FIG. 10 is another perspective view of a section of the upper section of the tree stand including the top seat support according to the present invention;

FIG. 24 is another perspective view of a locking device according to the present invention.

DETAILED DESCRIPTION

Figure 1:
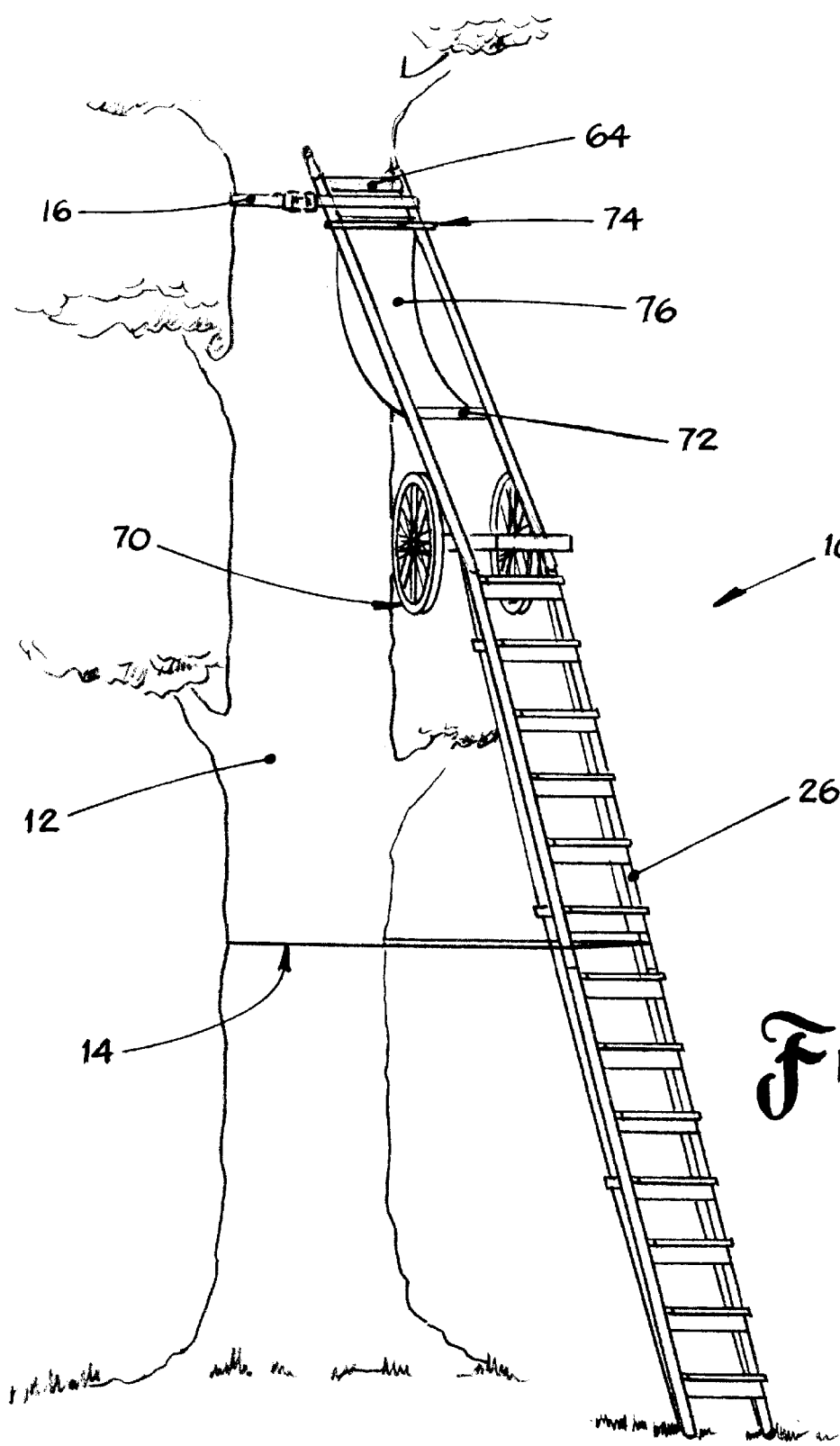
FIG. 1 is a perspective view of a tree stand according to the present invention.
Figure 2:
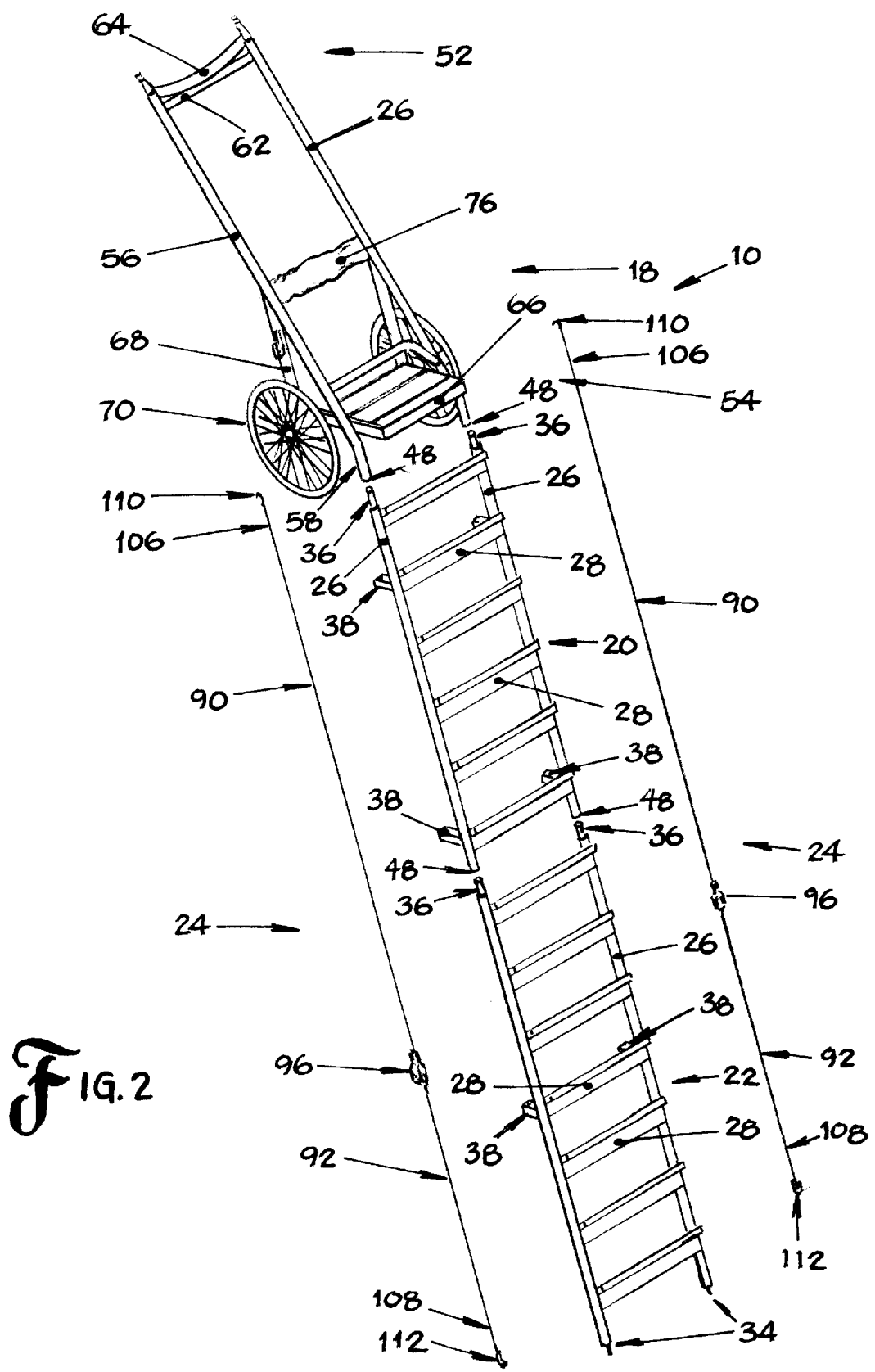
FIG. 2 is an exploded view of the tree stand according to the present invention.

The present invention is a tree stand, as shown in FIG. 1. FIG. 1 shows the tree stand secured against a tree using an initial securing cable near the middle of the tree stand and a ratchet strap at an upper section of the tree stand. FIG. 2 shows the tree stand exploded into an upper section, middle section, lower section and a pair of tensioner cable units. The upper section provides standing room and seating for the user of the tree stand. The lower section and the middle section support the upper section in the air and against the tree. The lower section and the middle section include a pair of side rails with ladder rungs attached between the side rails. The ladder rungs allow access by the user to the upper section by climbing the ladder rungs. The ladder also provide structural support to the middle section and the lower section. The tensioner cable units provide tension to hold together the upper section, middle section and lower section.

Figure 3:
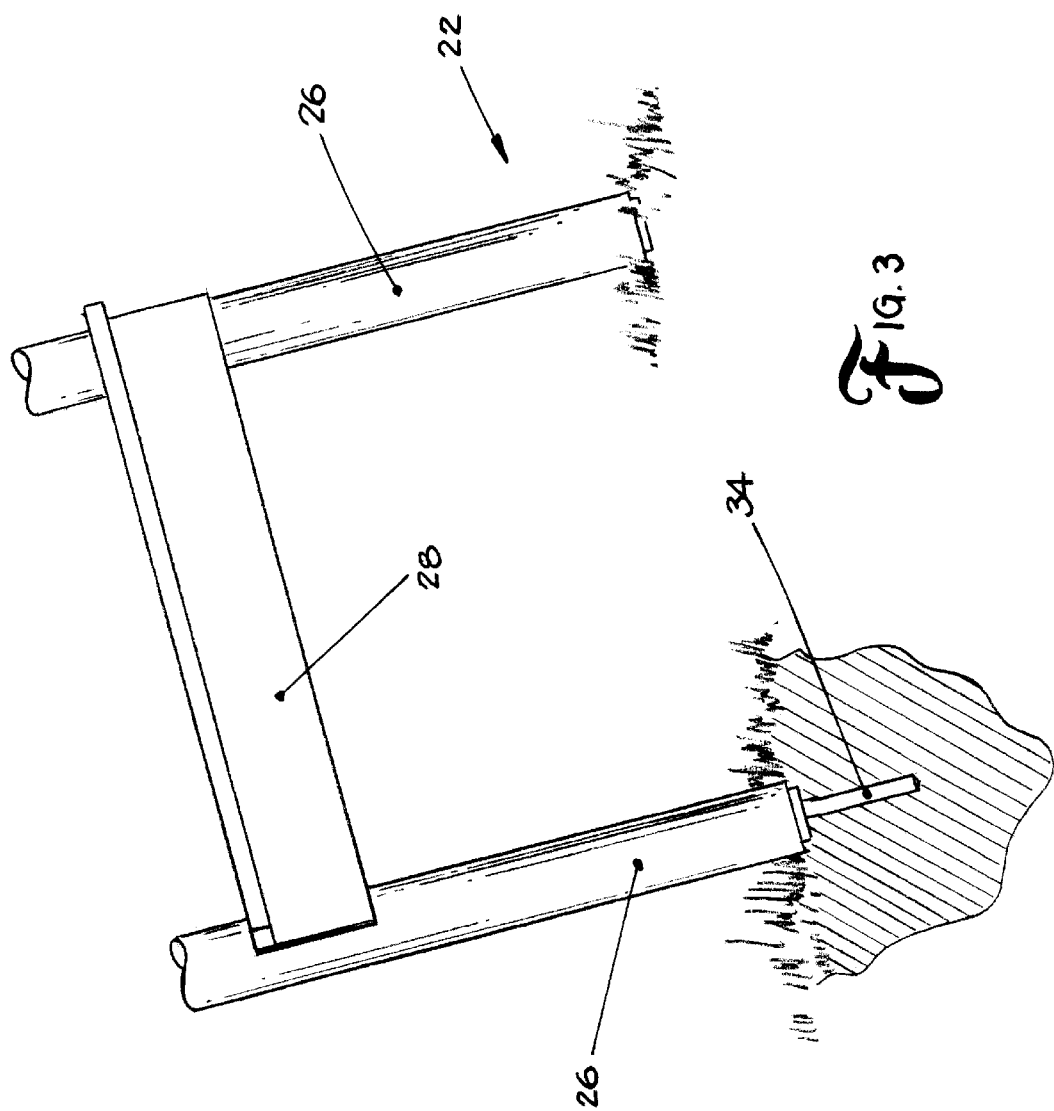
FIG. 3 is a perspective view of a bottom of the tree stand according to the present invention.
Figure 4:
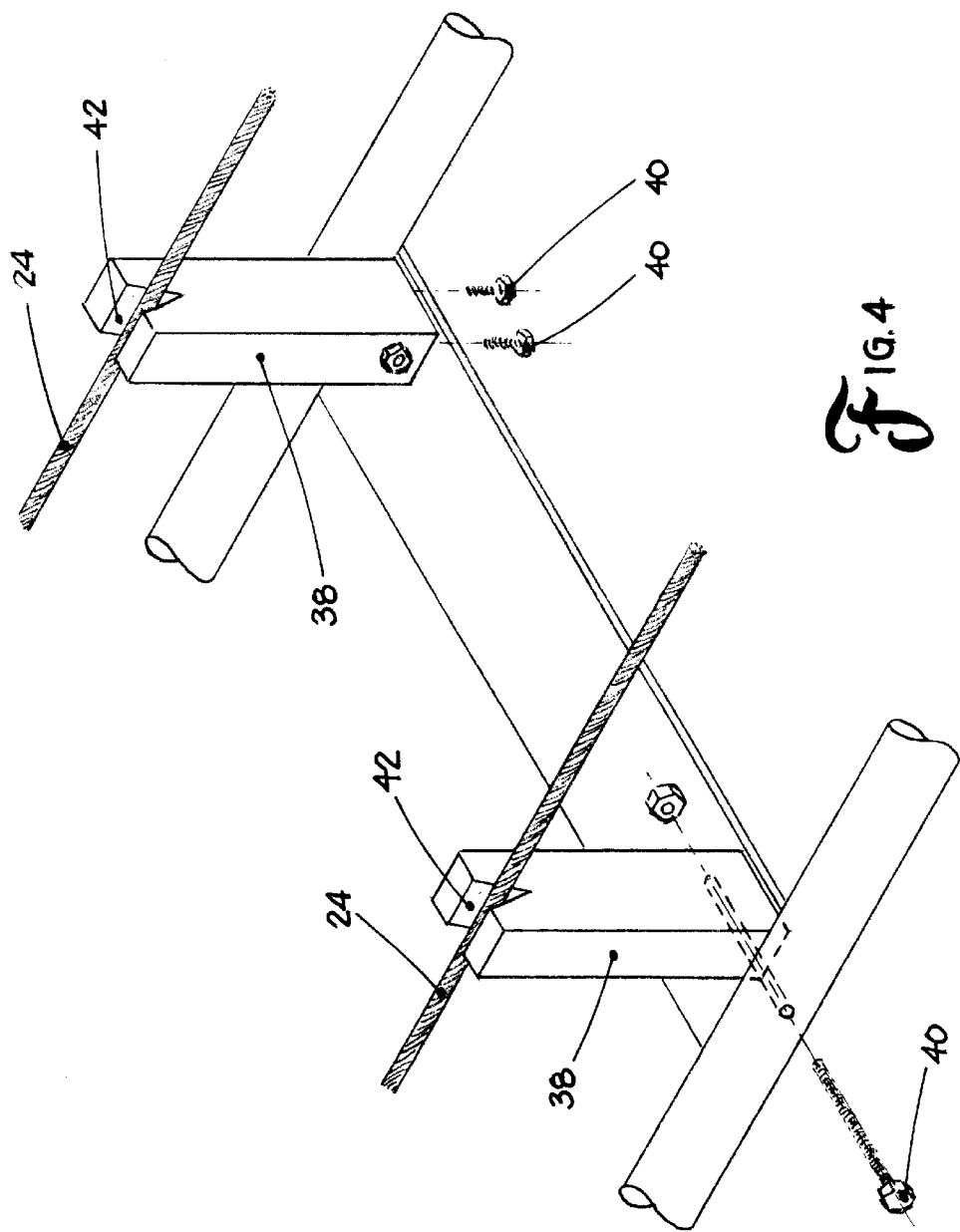
FIG. 4 is a perspective view of a section of the tree stand including cable guide blocks according to the present invention.

The lower section includes a top end and a bottom end, as shown in FIG. 2. The bottom end of the lower section include a ground spike extending from the bottom of each of the lower section side rails, as shown in more detail in FIG. 3. The top end of the lower section includes a male end extending from each of the side rails. The lower section also includes a cable guide block extending rearward from each side of the lower section. FIG. 4 shows a detailed rear view of one of the cable guide blocks connected to one of the rails and one of the ladder rungs using fasteners. The cable guide blocks include a cable groove to receive the tensioner cable unit. The middle section includes a top end and a bottom end, as shown in FIG. 2. The bottom end of the middle section includes a female end at the bottom of each of the side rails. The top end of the middle section includes a male end extending from each of the side rails. The middle section also includes two cable guide blocks extending rearward from each side of the middle section, which are attached in the same manner as shown in FIG. 4.

Figure 5:
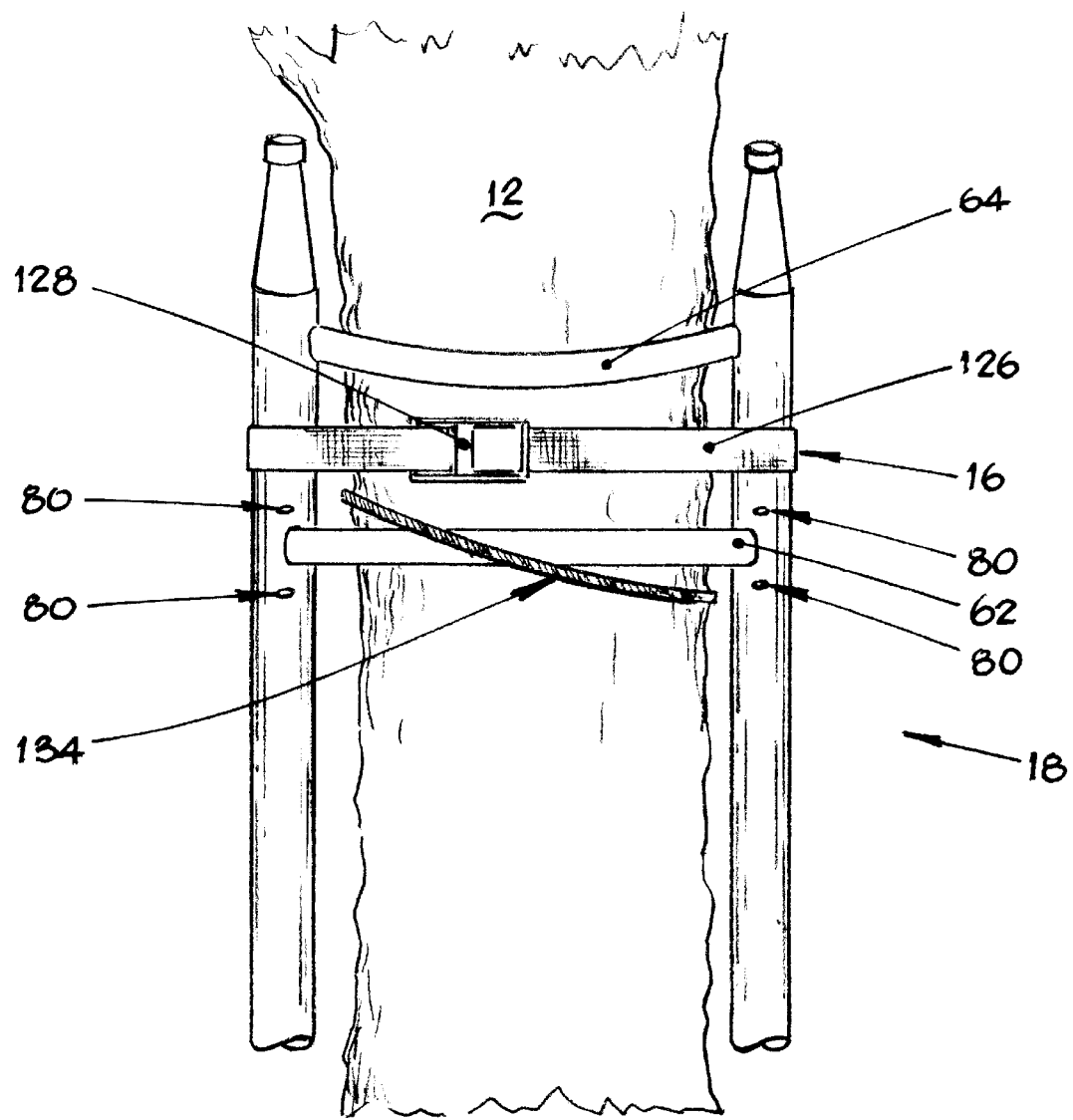
FIG. 5 is a perspective view of a top of the tree stand according to the present invention.

The upper section is shown in FIGS. 1–2, 5–8, 11–16 and 22. The upper section includes two side rails and has a top and a bottom. The side rails of the upper section differ from the side rails of the middle section and the lower section. The side rails of the upper section have an upper portion and a lower portion. The lower portion of each of the upper section side rails is in line with the side rails of the lower section and middle section. The lower portions include female ends at the bottom of the upper section side rails. The upper portion of the upper section side rails angles back towards the tree, so that the top of the upper section may rest against the tree. Near the top of the upper section is a straight crossbar and a curved crossbar, as shown in FIG. 5. Both the straight crossbar and curved crossbar provide structural support between the side rails of the upper section. The curved crossbar is curved and mounted above the straight crossbar in order to provide increased contact with the tree for increased stability. Both the straight crossbar and curved crossbar are covered in cloth. The cloth is used to muffle noise which could occur between the crossbars and the tree, when the tree stand is in use. A platform is mounted between lower portions of the upper section side rails. A pair of platform supports are mounted to the rear of the platform and the upper portions of the upper section side rails. The platform supports support the rear of the platform and are drilled at the bottom to receive a axle for attaching the wheels shown in FIGS. 1–2, 6–8 and 15–16. The upper section also includes bottom seat support, a top seat support and canvas attached between the top seat support and bottom seat support to act as a seat, as shown in FIGS. 6–10. The bottom seat support is fixed between the upper portions of the upper section side rails, near the lower portion of the upper section side rails. The bottom seat support provides structural support between the upper section side rails, as well supporting the user. The top seat support is removable and includes two seat pins. The upper portion near the top of the upper section side rails includes seat pin holes to receive the seat pins. Two sets of seat pin holes are shown on the upper section side rails to allow adjustability of positioning the top seat support. The canvas is shown rolled up on the top seat support for storage. The upper section also includes a footrest rotatably attached between the upper section side rails, just above the platform, as shown in FIGS. 2 and 11–14. The footrest is made up of two footrest sides and a footrest cross member. Each of the footrest sides are rotatably attached to the upper section side rails with the footrest cross member attached between the footrest sides. The footrest cross member provides an area for the user to rest the feet of the user.

Figure 15:
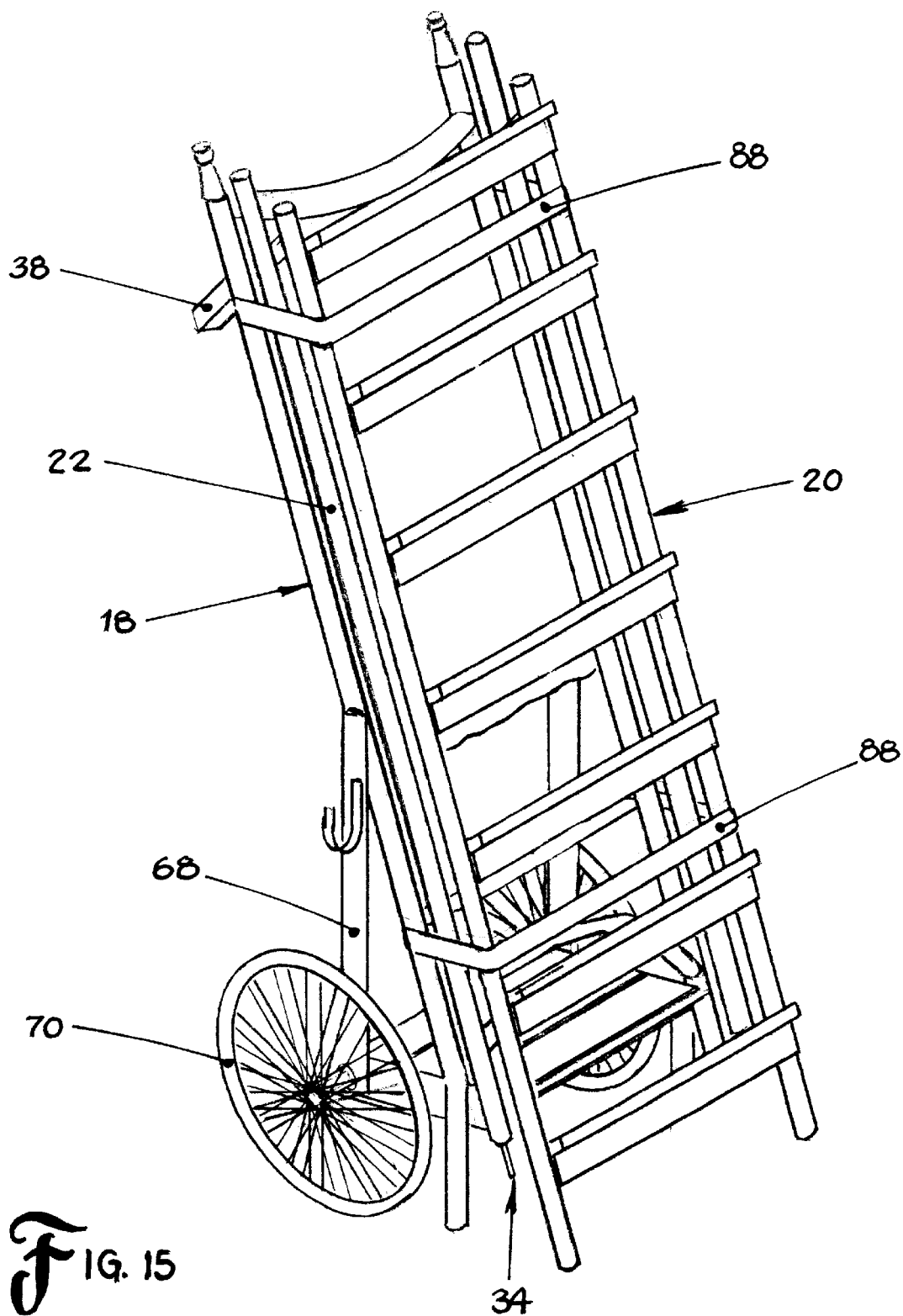
FIG. 15 is a front perspective view of the tree stand disassembled for storage or transport according to the present invention.
Figure 16:
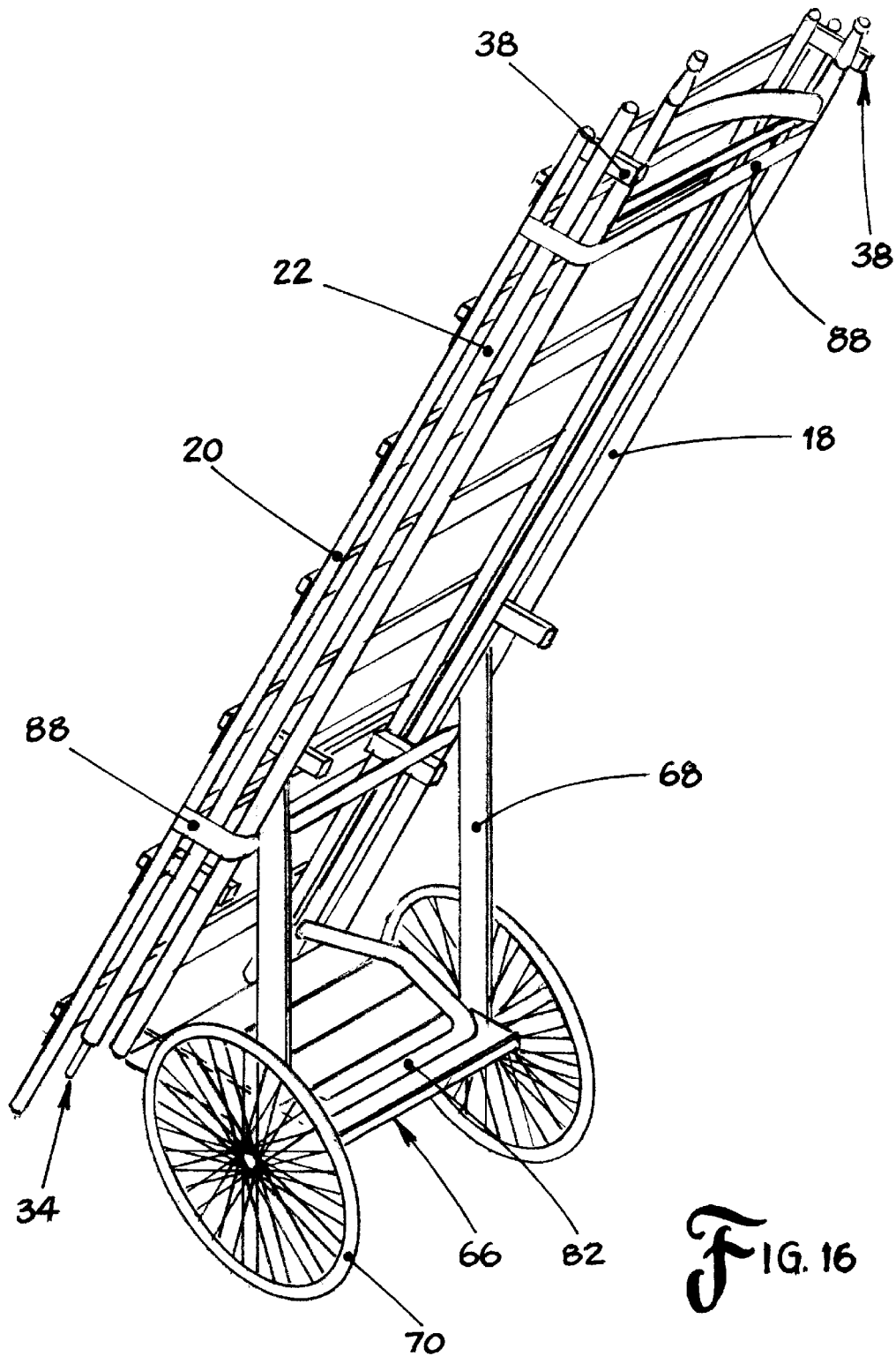
FIG. 16 is a rear perspective view of the tree stand disassembled for storage or transport according to the present invention.

FIGS. 15–16 show the tree stand dissembled in a storage and transport state. FIG. 15 shows a front view and FIG. 16 shows a rear view of the dissembled tree stand. The upper section acts as a base for storage and transport. The lower section and middle section are shown strapped with straps against the upper section side rails. The wheels allow the dissembled tree stand to be transported by wheeling the strapped upper, middle and lower sections to and from a desired location. As shown in FIG. 2, the dissembled tree stand is laid out for assembly. The male ends of the lower section side rails are inserted into the female ends of the middle section side rails. The male ends of the middle section side rails are inserted into the female ends of the upper section side rails. Next, the tensioner cable units are attached to hold the upper, middle and lower sections together.

Figure 17:
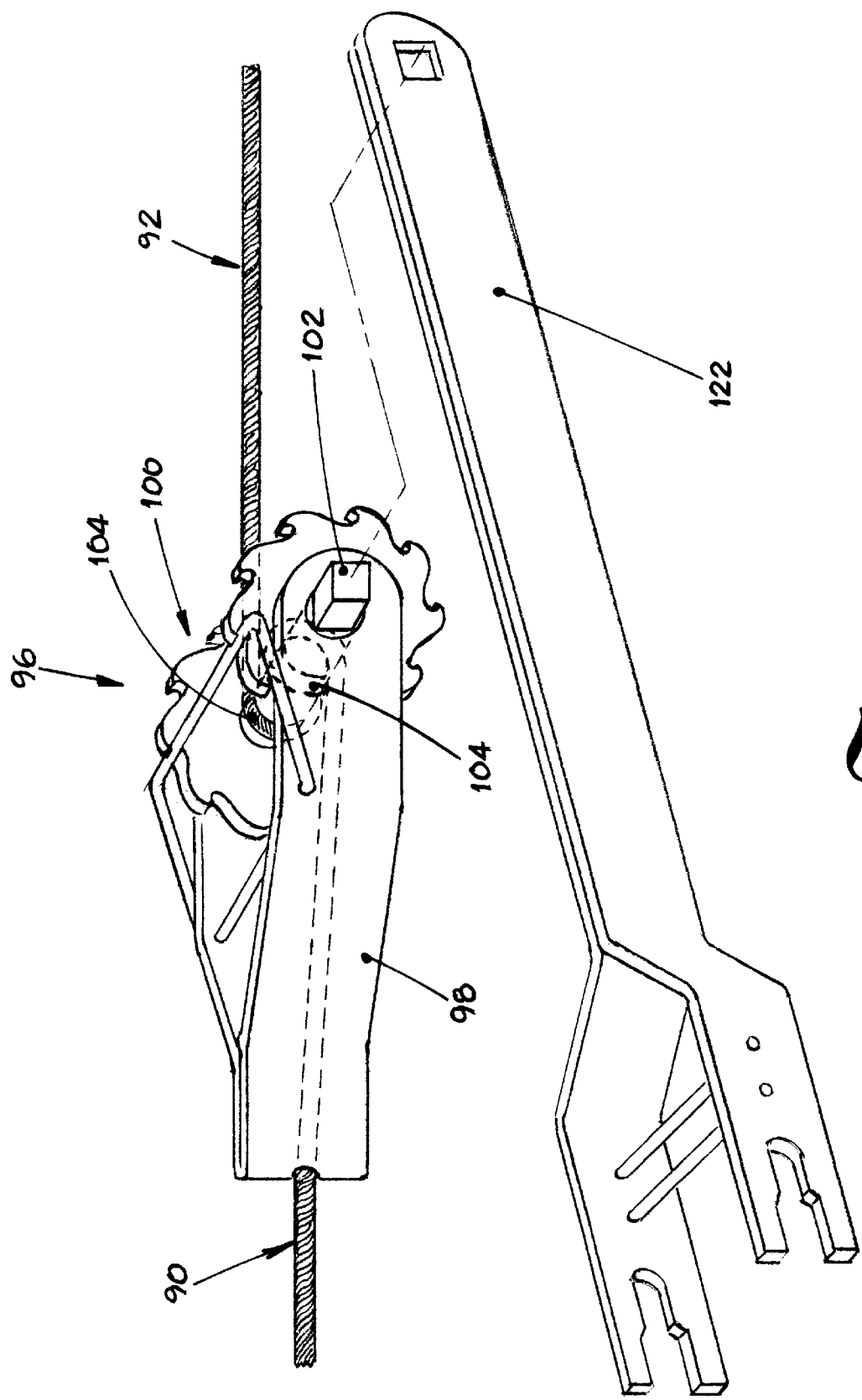
FIG. 17 is a perspective view of a ratchet mechanism and wrench according to the present invention.
Figure 18:
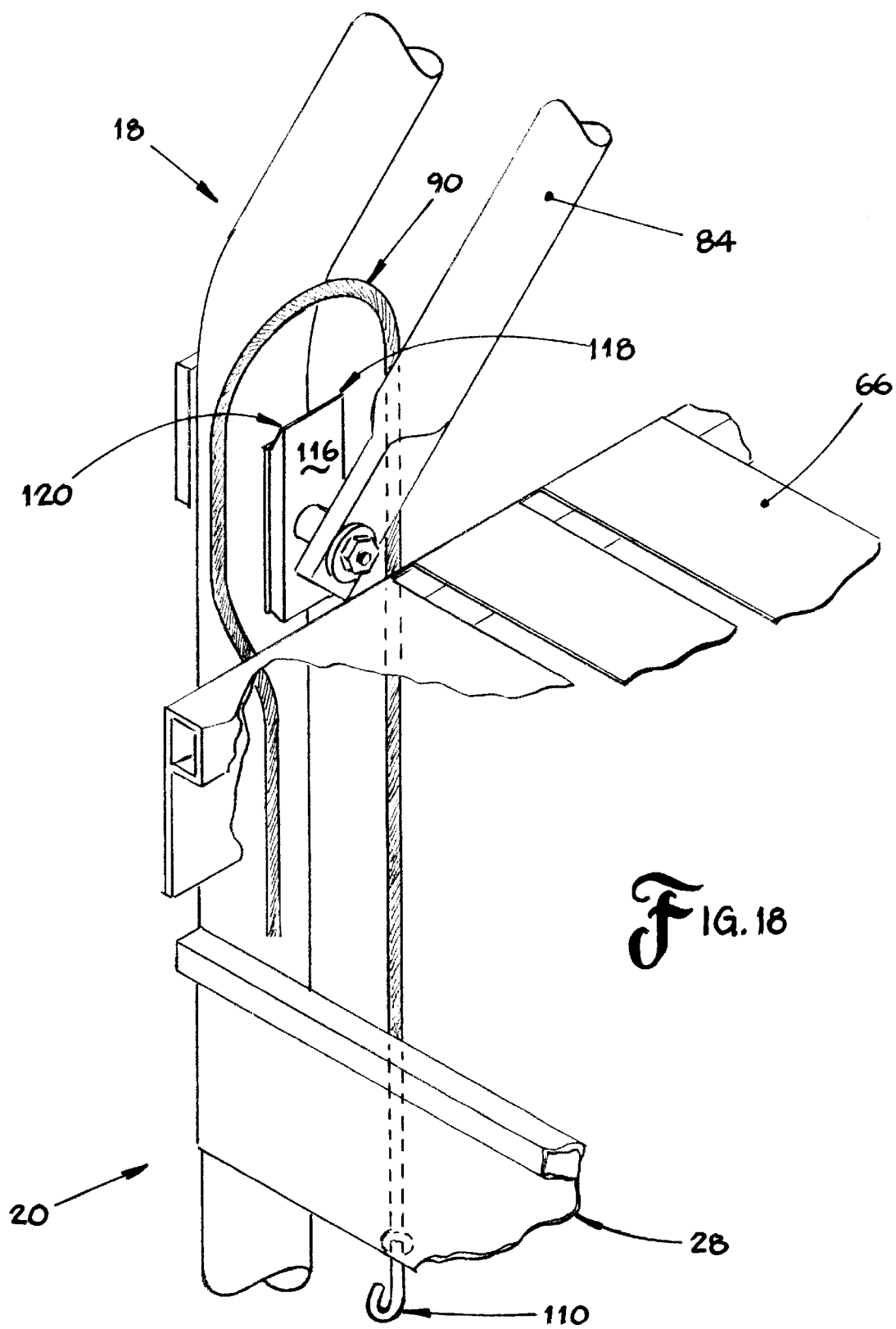
FIG. 18 is a close up perspective view of a cable loop guide block of the tree stand according to the present invention.
Figure 19:
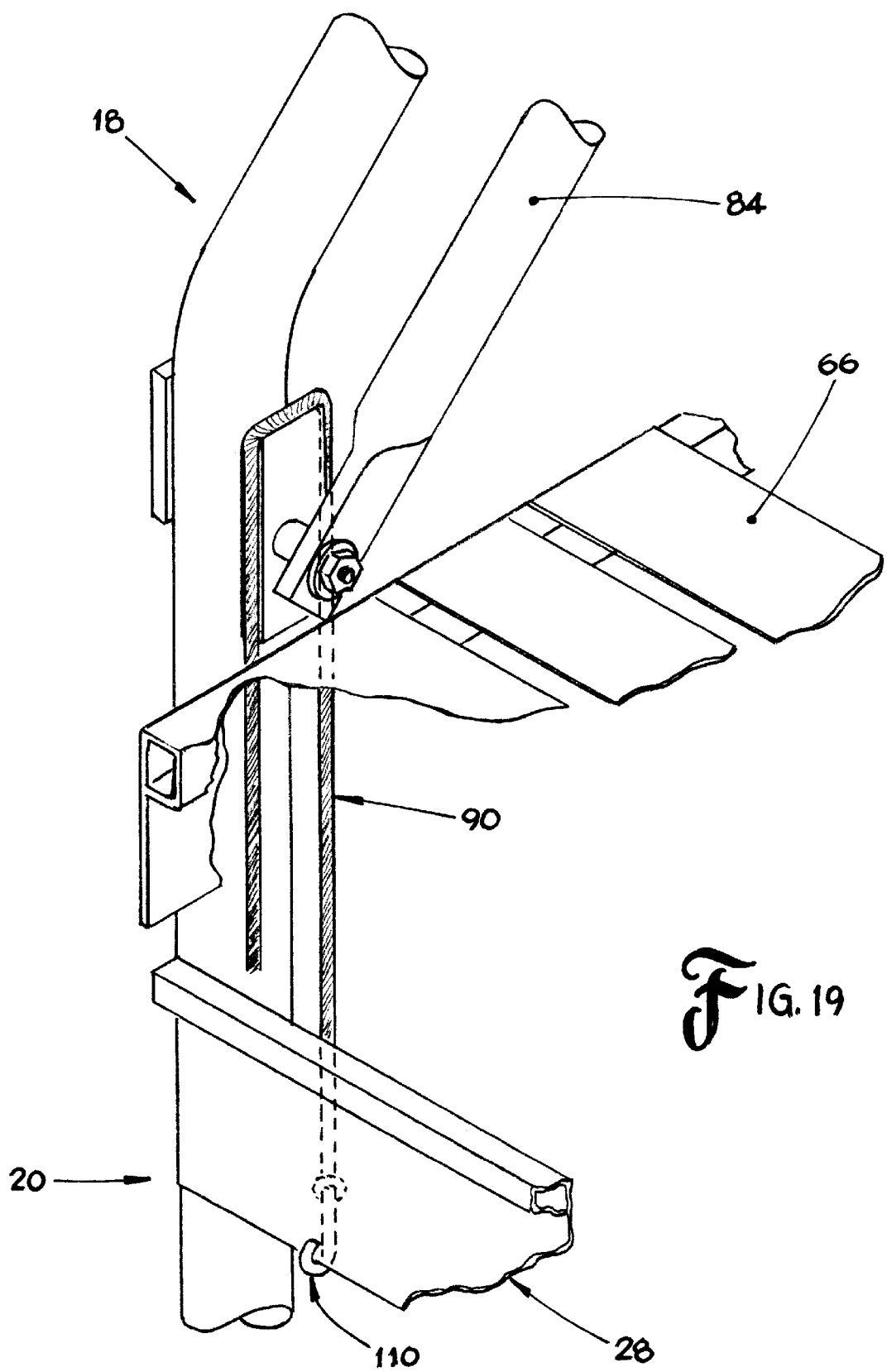
FIG. 19 is another close -up perspective view of a cable loop guide block of the tree stand according to the present invention.
Figure 20:
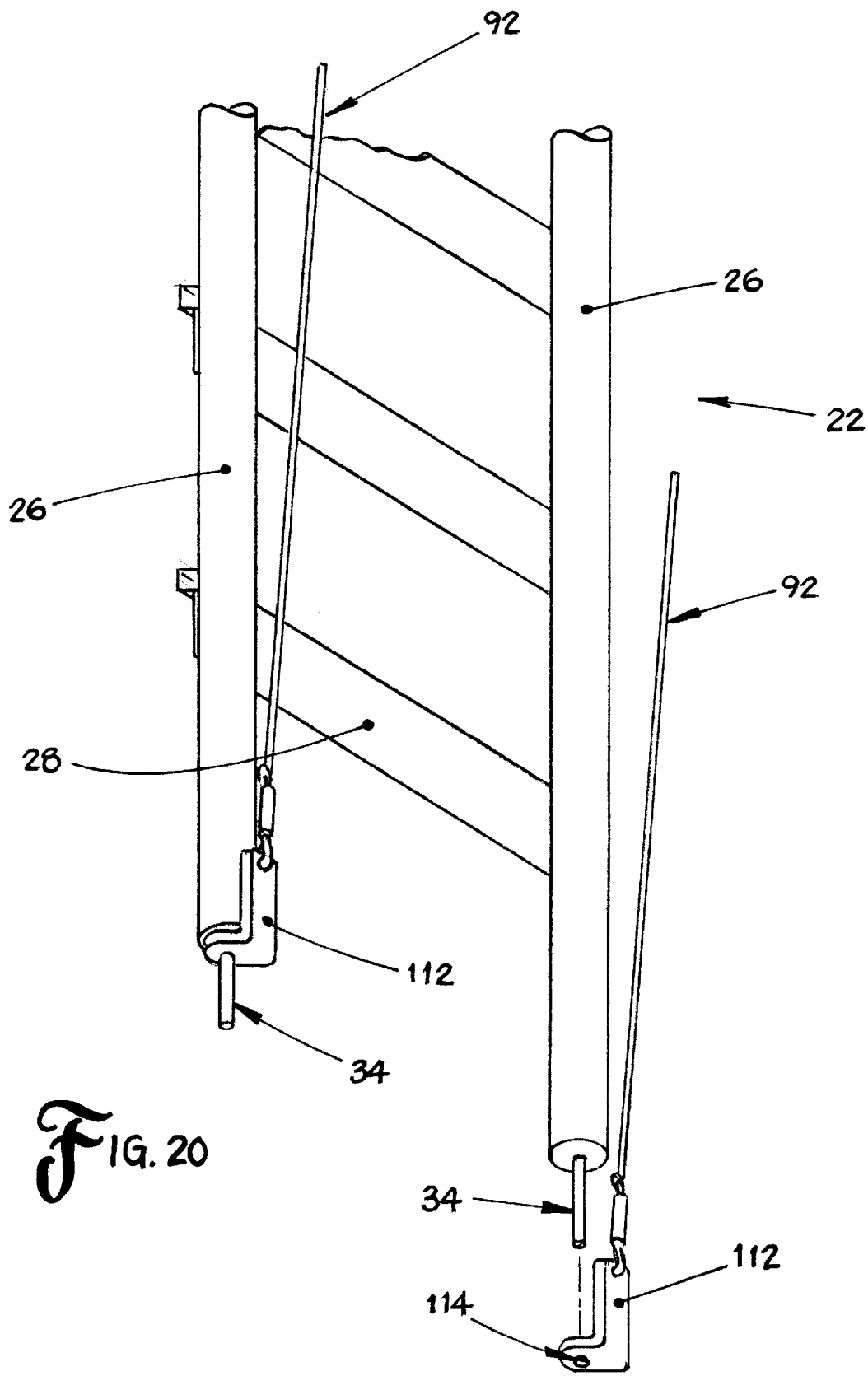
FIG. 20 is another perspective view of the bottom of the tree stand according to the present invention.
Figure 21:
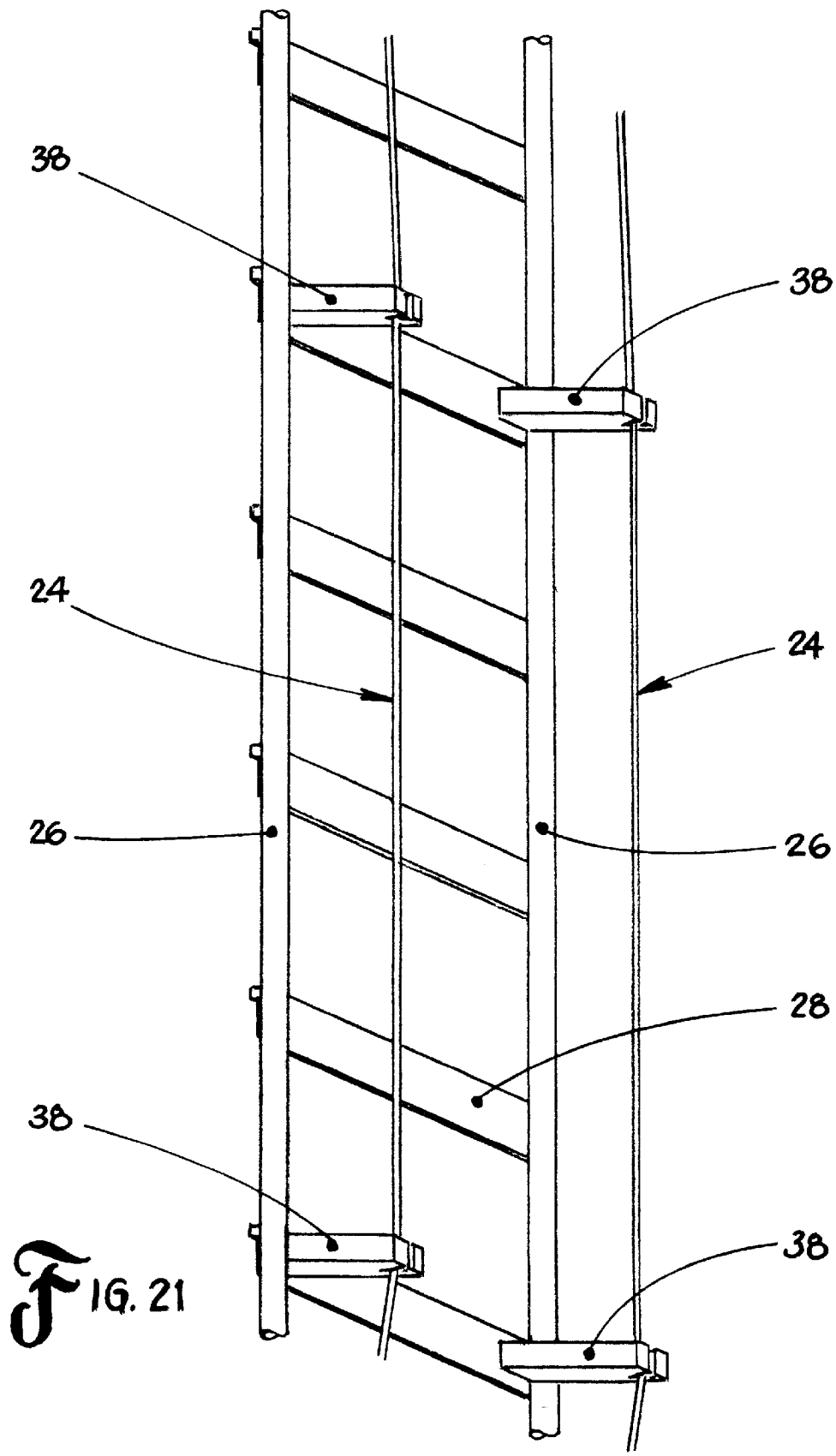
FIG. 21 is another perspective view of a section of the tree stand including cable guide blocks according to the present invention.

Each tensioner cable unit includes a top cable, bottom cable and a cable tensioner ratchet, as shown in FIGS. 2, 4 and 17–21. The cable tensioner ratchet includes a frame, a ratchet mechanism and winding axle connected to the ratchet mechanism. The top cable has a ratchet end and a hook end and the bottom cable has a ratchet end and a spike bracket end. The ratchet ends of both the top cable and bottom cable are wrapped around the winding axle of the cable tensioner ratchet, as shown in FIG. 17. The hook end of the top cable includes a hook attached to the hook end. The spike bracket end of the bottom cable includes a ground spike bracket attached to the spike bracket end. The ground spike bracket is an L-shaped bracket with a hole to slide the ground spike bracket over the ground spike extending from the bottom of the lower section. The upper section includes cable loop guide block attached to the inside of each of the upper section side rails, just above the platform, as shown in FIGS. 18–19. The cable loop guide block includes a ridge that forms a guide channel between the ridge and the upper section side rails. The tensioner cable units are attached by first hooking the hook of the hook end to one of the ladder rungs of the middle section from the rear, as shown in FIGS. 18–19. The top cable is then looped around the guide channel formed by the cable loop guide block, such that the top cable runs behind the ladder rungs of the middle section and the lower section. The ground spike bracket is slipped over the ground spike of the lower section, as shown in FIG. 20. The top cable and bottom cable are then positioned into the groove of each of the cable guide blocks extending reward from the middle section and lower section, as shown in FIGS. 4 and 21. The ratchet wrench shown in FIG. 17 is used to tighten the top cable and the bottom cable by rotating the winding axle. The top cable and bottom cable are tighten until the assembly of the upper, middle and lower sections are slightly bowed under the tension of the cable tensioner unit. The tensioner cable unit creates a bow type effect similar to an archery bow, which strengthens the whole assembly while holding the upper, middle and lower sections together.

Figure 22:
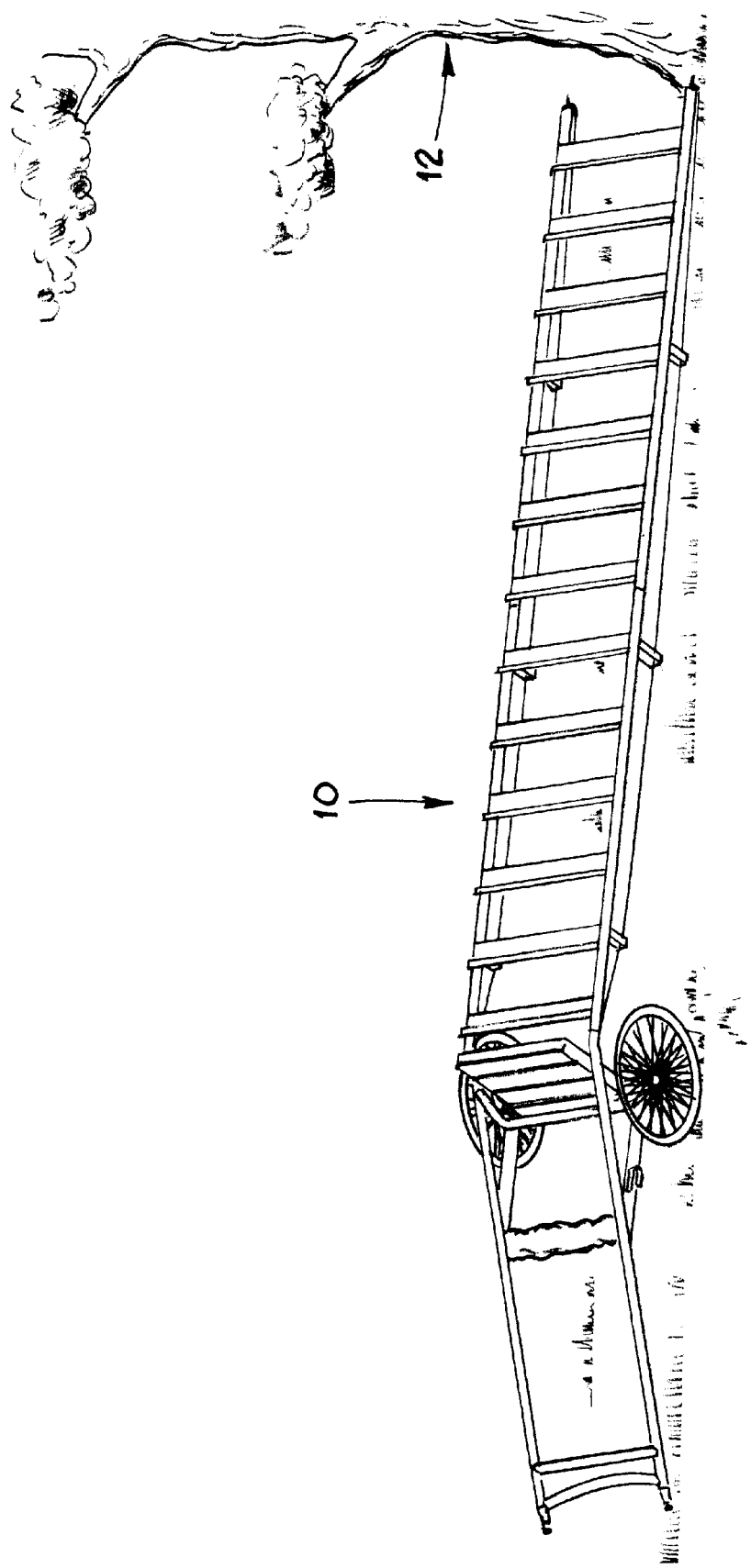
FIG. 22 is another perspective view of the tree stand according to the present invention.

FIG. 22 shows the tree stand assemble and lying on its side on the ground at the bottom of the tree. The tree stand is positioned against the tree in a similar manner that one would place a ladder against a tree, such that at least the curved cross bar rests against the trunk of the tree. The bottom of the lower section is pressed downward to force the ground spikes into the ground, as shown in FIG. 3. The initial securing cable is wrapped around the tree and the tree stand as high as possible without climbing the tree stand. The initial securing cable aids in the prevention of the tree stand from falling away from the tree, as the user climbs the tree stand to install the ratchet strap. The ratchet strap is a strap using a ratchet device to tighten the strap. The ratchet strap is wrapped around the top of the upper section and the tree to secure the tree stand to the tree. The ratchet strap is tighten by using the ratchet device. Next, the canvas can be unrolled by rotating the top seat support and the seat pins inserted into a set of seat pin holes, as shown in FIGS. 6–10.

Figure 11:
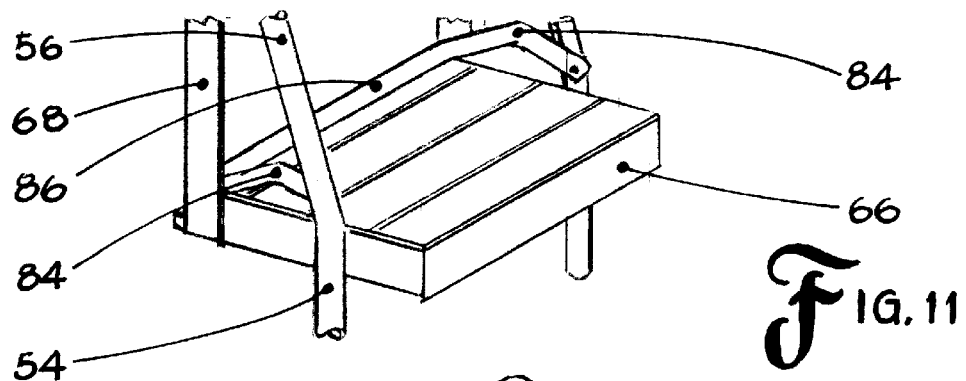
FIG. 11 is a perspective view of a section of the upper section of the tree stand including a platform and footrest according to the present invention.
Figure 12:
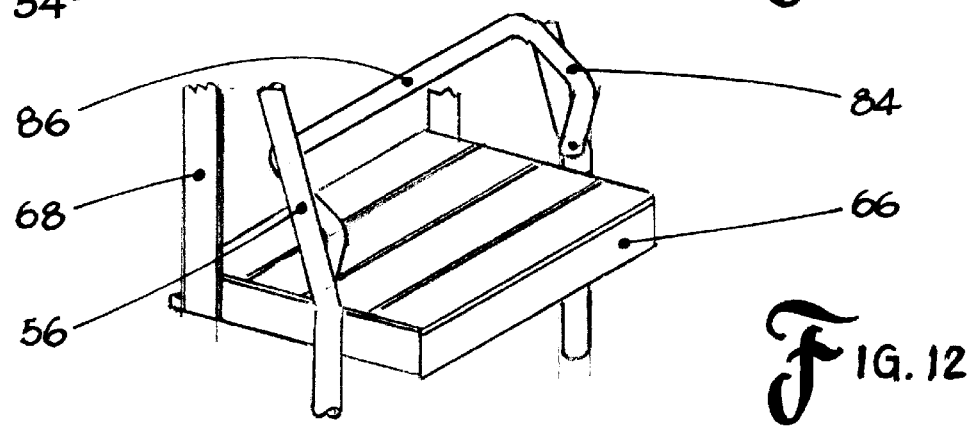
FIG. 12 is another perspective view of a section of the upper section of the tree stand including the platform and footrest according to the present invention.
Figure 13:
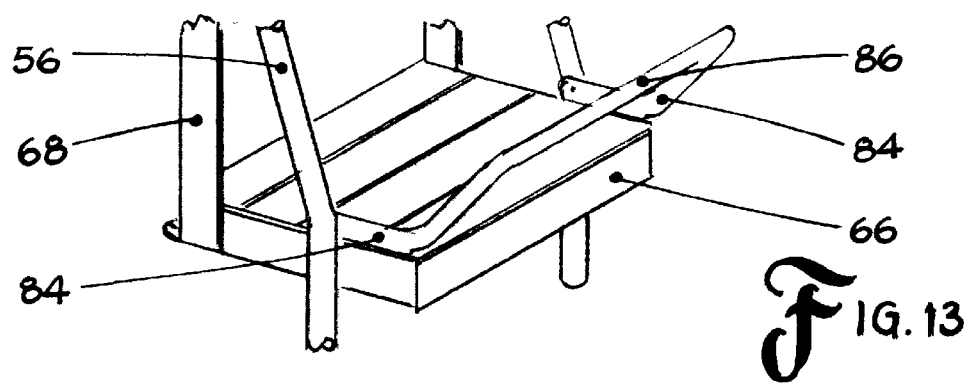
FIG. 13 is another perspective view of a section of the upper section of the tree stand including the platform and footrest according to the present invention.
Figure 14:
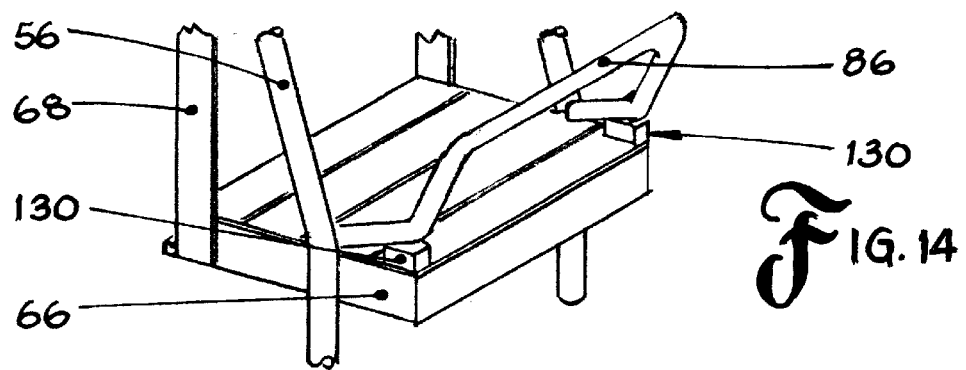
FIG. 14 is another perspective view of a section of the upper section of the tree stand including the platform and footrest according to the present invention.
Figure 23:
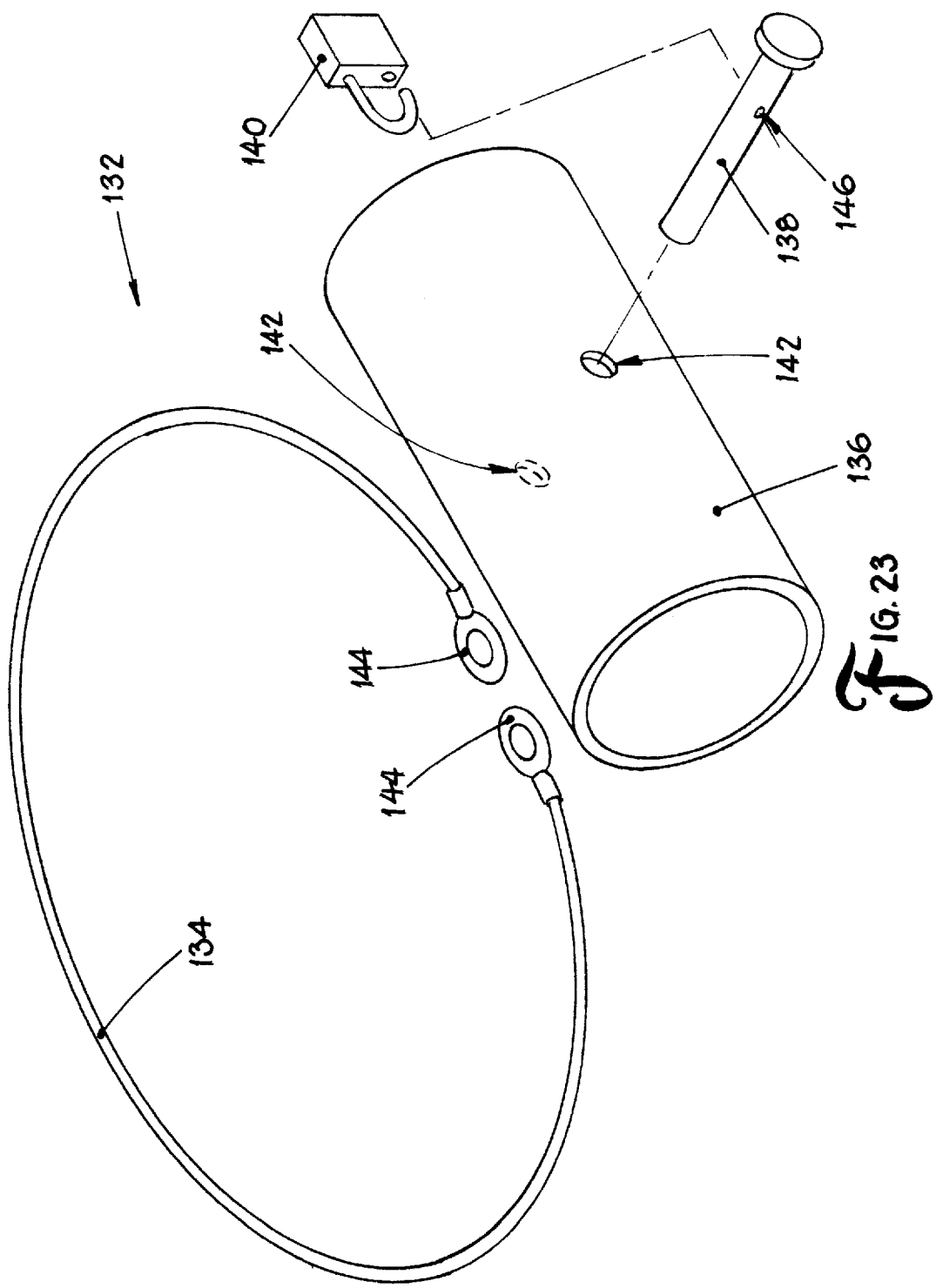
FIG. 23 is a perspective view of a locking device according to the present invention.

FIGS. 11–13 show the rotation of the foot rest outward for use by the user. FIG. 14 shows riser blocks which can be employed to adjust the height of the foot rest. FIGS. 23–24 show a locking device to lock the tree stand to the tree. The locking device includes a lock cable, lock shield, lock pin and a padlock. The lock cable includes two eyelet ends. The lock shield is an open cylinder which includes two aligned lock pin holes. The lock pin includes a lock hole. To use the locking device, the lock cable is wrapped around the tree and the tree stand. The eyelet ends of the lock cable are inserted into lock shield. The lock pin is inserted into one of the lock pin holes, on into the eyelets of the lock cable and finally through the other lock pin hole. The padlock is placed into the lock shield, inserted into the lock hole and locked. The lock pin is long enough such that either end of the lock pin can not clear any of the lock pin holes of the lock shield when the padlock is installed on the lock pin. The lock shield is just large enough to fit a hand inside the open cylinder, yet small enough to prevent entry by most bolt cutters.

What is claimed is:

1. A tree stand comprising:
   a top to rest said tree stand against an upright object;
   a bottom to rest said tree stand against the ground;
   at least two sections between said top and said bottom which can be assembled to form said tree stand and disassembled to reduce the transportable size of said tree stand;
   said at least two sections having a pair of side rails which define an outside form of each of said at least two sections;
   a plurality of ladder rungs attached between said side rails;
   a platform between said side rails near said top; and
   at least one cable tensioner unit with a cable connected to and longitudinally extending directly between said top and bottom, whereby said at least one cable tensioner unit provides tension on said cable between said top and bottom to hold said at least two sections together under tension.

2. The tree stand of claim 1, wherein said at least one cable tensioner unit includes a ratchet mechanism to tighten said at least one cable to apply tension between said top and bottom.

3. The tree stand of claim 2, wherein there are two cable tensioner units mounted between said top and bottom of said tree stand and between said assembled side rails of said at least two sections, each of said two cable tensioner units having a cable and a ratchet mechanism.

4. The tree stand of claim 3, wherein a plurality of cable guide blocks are mounted on said tree stand; wherein said cable guide blocks extend outward towards said upright object from said tree stand; and wherein said cable guide blocks include a cable groove to receive said cables from said two cable tensioner units.

5. The tree stand of claim 1, wherein said at least one cable tensioner unit includes two cables. between said top and bottom; and wherein said at least one cable tensioner unit includes a ratchet mechanism between said cables to tighten said cables to apply tension between said top and bottom.

6. The tree stand of claim 5, wherein there are two cable tensioner units mounted between said top and bottom of said tree stand and between said assembled side rails of said at least two sections each, of said two cable tensioner units having two cables and a ratchet mechanism between each set of said two cables.

7. The tree stand of claim 6, wherein a plurality of cable guide blocks are mounted on said tree stand; wherein said cable guide blocks extend outward towards said upright object from said tree stand; and wherein said cable guide blocks include a cable groove to receive said cables from said two cable tensioner units.

8. The tree stand of claim 1, wherein there are two cable tensioner units mounted between said top and bottom of said tree stand and between said assembled side rails of said at least two sections each, of said two cable tensioner units having a cable.

9. A tree stand comprising:
   a top to rest said tree stand against an upright object;
   a bottom to rest said tree stand against the ground;
   an upper section which forms said top of said tree stand, said upper section including a top end and a bottom end;
   a lower section which forms said bottom of said tree stand said lower section including a top end and a bottom end;
   at least one middle section removably fastened between said bottom end of said upper section and said top end of said lower section to form said tree stand said middle section including a top end to be fastened to said bottom end of said upper section and a bottom end to be fastened to said top end of said lower section;
   said upper, middle and lower sections including a pair of side rails which define an outside form of said upper, middle and lower sections;
   a plurality of ladder rungs attached between said side rails of said middle and lower sections;
   a platform between said side rails of said upper section near said bottom end of said upper section; and
   at least one cable tensioner unit with a cable connected to and longitudinally extending directly between said top and bottom, whereby said at least one cable tensioner unit provides tension on said cable between said top and bottom to hold said upper, middle, and lower sections together under tension.

10. The tree stand of claim 9, wherein there are two cable tensioner units; wherein each of said cable tensioner units includes a top cable and a bottom cable between said top and bottom of said tree stand; and wherein each of said cable tensioner units includes a ratchet mechanism between said top and bottom cables to tighten said cables to apply tension between said top and bottom of said tree stand.

11. The tree stand of claim 10, wherein a hook is attached to an end of said top cable opposite said ratchet mechanism and wherein said hook is hooked near said top of said tree stand.

12. The tree stand of claim 10, wherein said bottom end of said lower section includes a ground spike extending downward to enter the ground, wherein a ground spike bracket is attached to an end of said bottom cable opposite said ratchet mechanism; and wherein said ground spike bracket includes a hole, such that said ground spike bracket can be slipped over said ground spike to be attached to said tree stand.

13. The tree stand of claim 10, wherein at least one cable guide block for each of said two cable tensioner units is mounted on each side of said tree stand; wherein each of said cable guide blocks extend outward towards said upright object from said tree stand; and wherein said cable guide blocks include a cable groove to receive said top and bottom cables from said two cable tensioner units.

14. The tree stand of claim 10, wherein a cable loop guide block is mounted on each side rail of said upper section; and wherein each of said cable loop guide blocks forms a channel to guide and retain each of said top cables of said two cable tensioner units in place when tension is applied to said two cable tensioner units.

15. The tree stand of claim 9, wherein there are two cable tensioner units; wherein each of said cable tensioner units includes a top cable and a bottom cable between said top and bottom of said tree stand; wherein each of said cable tensioner units includes a ratchet mechanism between said top and bottom cables to tighten said cables to apply tension between said top and bottom of said tree stand; wherein a hook is attached to an end of said top cable opposite said ratchet mechanism and wherein said hook is hooked near said top of said tree stand; wherein said bottom end of said lower section includes a ground spike extending downward to enter the ground; wherein a ground spike bracket is attached to an end of said bottom cable opposite said ratchet mechanism; wherein said ground spike bracket includes a hole, such that said ground spike bracket can be slipped over said ground spike to be attached to said tree stand; wherein at least one cable guide block for each of said two cable tensioner units is mounted on each side of said tree stand; wherein each of said cable guide blocks extend outward towards said upright object from said tree stand; wherein said cable guide blocks include a cable groove to receive said top and bottom cables from said two cable tensioner units; wherein a cable loop guide block is mounted on each side rail of said upper section; and wherein each of said cable loop guide blocks forms a channel to guide and retain each of said top cables of said two cable tensioner units in place when tension is applied to said two cable tensioner units.

16. The tree stand of claim 9, wherein canvas is mounted between said top end of said upper section and said platform to form a seat.

17. The tree stand of claim 9, wherein a curve crossbar is mounted between said side rails of said upper section near said top end of said upper section to rest against a round upright object such as a tree.

18. The tree stand of claim 9, wherein wheels are mounted on said upper section to allow transport of said tree stand.

19. The tree stand of claim 9, a footrest is rotatably attached above said platform, so that said foot rest can be folded away during storage of said tree stand.

20. The tree stand of claim 9, wherein there are two cable tensioner units; wherein each of said cable tensioner units includes a top cable and a bottom cable between said top and bottom of said tree stand; wherein each of said cable tensioner units includes a ratchet mechanism between said top and bottom cables to tighten said cables to apply tension between said top and bottom of said tree stand; wherein a hook is attached to an end of said top cable opposite said ratchet mechanism and wherein said hook is hooked near said top of said tree stand; wherein said bottom end of said lower section includes a ground spike extending downward to enter the ground; wherein a ground spike bracket is attached to an end of said bottom cable opposite said ratchet mechanism; wherein said ground spike bracket includes a hole, such that said ground spike bracket can be slipped over said ground spike to be attached to said tree stand; wherein at least one cable guide block for each of said two cable tensioner units is mounted on each side of said tree stand; wherein each of said cable guide blocks extend outward towards said upright object from said tree stand; wherein said cable guide blocks include a cable groove to receive said top and bottom cables from said two cable tensioner units; wherein a cable loop guide block is mounted on each side rail of said upper section; wherein each of said cable loop guide blocks forms a channel to guide and retain each of said top cables of said two cable tensioner units in place when tension is applied to said two cable tensioner units wherein canvas is mounted between said top end of said upper section and said platform to form a seat; wherein a curve crossbar is mounted between said side rails of said upper section near said top end of said upper section to rest against a round upright object such as a tree; wherein wheels are mounted on said upper section to allow transport of said tree stand; and a footrest is rotatably attached above said platform, so that said foot rest can be folded away during storage of said tree stand.

* * * * *